US007969850B2

United States Patent
Hamano

(10) Patent No.: US 7,969,850 B2
(45) Date of Patent: Jun. 28, 2011

(54) OPTICAL ELEMENT, OPTICAL PICKUP DEVICE COMPRISING THE SAME, AND UNNECESSARY LIGHT ELIMINATION METHOD

(75) Inventor: Yasukazu Hamano, Kawaguchi (JP)

(73) Assignee: Enplas Corporation, Saitama (JP)

( * ) Notice: Subject to any disclaimer, the term of this patent is extended or adjusted under 35 U.S.C. 154(b) by 1123 days.

(21) Appl. No.: 11/415,595

(22) Filed: May 2, 2006

(65) Prior Publication Data
US 2006/0256696 A1 Nov. 16, 2006

(30) Foreign Application Priority Data

May 12, 2005 (JP) ................................. 2005-139976

(51) Int. Cl.
*G11B 7/00* (2006.01)
(52) U.S. Cl. ......... 369/112.05; 369/112.03; 369/112.06; 369/112.07
(58) Field of Classification Search ............. 369/112.07, 369/112.12, 112.03, 112.05, 112.06
See application file for complete search history.

(56) References Cited

U.S. PATENT DOCUMENTS

| | | | | |
|---|---|---|---|---|
| 6,369,377 B1* | 4/2002 | Shih et al. | ...................... | 250/225 |
| 7,046,441 B2* | 5/2006 | Huang et al. | ................... | 359/569 |
| 7,453,643 B2* | 11/2008 | Kleemann | ...................... | 359/571 |
| 2002/0003661 A1* | 1/2002 | Nakai | ............... | 359/569 |
| 2005/0195485 A1* | 9/2005 | Hirai et al. | ..................... | 359/569 |

FOREIGN PATENT DOCUMENTS

| | | |
|---|---|---|
| JP | H02-008802 | 1/1990 |
| JP | H02-205802 | 8/1990 |
| JP | 2001-343512 | 12/2001 |
| JP | 2002-170272 | 6/2002 |
| JP | 2003-185818 | 7/2003 |
| WO | WO 2004102233 A1 * | 11/2004 |

* cited by examiner

*Primary Examiner* — Wayne R Young
*Assistant Examiner* — Latanya Bibbins
(74) *Attorney, Agent, or Firm* — DLA Piper LLP (US)

(57) ABSTRACT

The optical element comprises a first diffraction structure for generating three beams by diffracting light from a light source and a second diffraction structure that exhibits structural birefringence for a prescribed polarized light returning to the light source. The first diffraction structure is formed on a first face of a translucent optical base material and the second diffraction structure is formed on a second face of the optical base material. The optical base material, the first diffraction structure and the second diffraction structure are formed of a single material.

10 Claims, 7 Drawing Sheets

OPTICAL ELEMENT, OPTICAL PICKUP DEVICE COMPRISING THE SAME, AND UNNECESSARY LIGHT ELIMINATION METHOD

BACKGROUND OF THE INVENTION

1. Field of the Invention

The present invention relates to an optical element and an optical pickup device comprising the same, and an unnecessary light elimination method. Particularly, it relates to an optical element that is preferable for properly emitting emission light from a light source and an optical pickup device comprising the same, and an unnecessary light elimination method.

2. Description of the Related Art

Conventionally, for optical information recording medium such as optical disk (CD, DVD) and magneto optic disk (MO), there has been employed an optical pickup device which writes and reads information through light such as laser beams.

FIG. 6 shows an example of such optical pickup device that has been employed conventionally.

Emission light that is coherent light emitted from a light source 2 is emitted as linearly polarized light, and travels towards an optical information recording medium 3 as outward light.

Outward light herein is a total name for the emission light of the light source 2 after emitted from the light source 2 until reaching the optical information recording medium 3. Even if the outward light changes the polarized state from linear polarization to circular polarization in the process of reaching the optical information recording medium 3, it is considered still remained as the outward light (the same applies hereinafter).

Further, inward light is a total name for the light that is reflected by the optical information recording medium 3 after emitted from the light source 2. Even if the inward light changes the polarized state from circular polarization to linear polarization in the process after being reflected by the optical recording medium 3, it is considered still remained as the inward light (the same applies hereinafter).

A polarizing diffraction element 5 is disposed at a position on the outward-light emission side of the light source 2, and the outward light makes incident on the polarizing diffraction element 5.

FIG. 7 shows an example of the polarizing diffraction element 5 of FIG. 6 (see 18$^{th}$ and 19$^{th}$ paragraphs and FIG. 3 of Patent Literature 1, for example).

The polarizing diffraction grating 5 is formed by laminating: a polarizing diffraction structure 8, in which a plurality of lattice-form birefringence materials 7 are provided on light-source side surface and the opposite-side surface (lower face in FIG. 7) of a first translucent plane substrate 6; and a three-beam diffraction structure 12, in which a diffraction grating 11 is provided on the light-source side surface and the opposite-side surface of a second translucent plane substrate 10, through a translucent adhesive agent 14 in such a manner that the first translucent plane substrate 6 comes on the light source 2 side.

In the polarizing diffraction structure 8, a plurality of birefringence materials 7 such as optical crystals and polymer liquid crystals exhibiting birefringence are provided to form periodical recessed-protruded structure. For the birefringence material 7, there is selected a material which has the same refractive index as that of the translucent adhesive agent 14 for prescribed linearly polarized light emitted from the light source 2, while having a different refractive index from that of the translucent adhesive agent 14 for the linearly polarized light whose polarization direction is orthogonal to that of the prescribed linearly polarized light.

Other than the polarizing diffraction structure 8 as shown in FIG. 7, there is also known a polarizing diffraction structure 9 as shown in FIG. 8, for example, in which a diffraction grating 16 is formed on the surface of a translucent substrate 15, and birefringence material 7 is buried in grating grooves 17 of the diffraction grating 16.

As shown in FIG. 7, the outward light making incident on the polarizing diffraction element 5 makes incident first on the first translucent plane substrate 6. Then, it makes incident on the polarizing diffraction structure 8 in the polarizing diffraction element 5.

The polarizing diffraction structure 8 functions as an isotropic refractive index layer for the TM polarized light (the light whose magnetic-field oscillating direction is parallel to the longitudinal direction of the grating groove 17 of the polarizing diffraction structure 8) as the outward light making incident from the light source 2 side, and lets through the TM polarized light as it is, since the refractive index of the birefringence material 7 and that of the translucent adhesive agent 14 become almost the same.

That is, as shown in FIG. 7A, the polarizing diffraction structure 8 lets through the TM polarized light that makes incident form the light source 2 side without diffraction.

The TM polarized light transmitting through the polarizing diffraction structure 8 makes incident on the second translucent plane substrate 10 and, then, makes incident on the three-beam diffraction structure 12 in the polarizing diffraction element 5.

The three-beam diffraction structure 12 diffracts the TM polarized light making incident from the polarizing diffraction structure 8 to generate and emit three beams (referred to as outward three beams hereinafter), which are constituted of zero-order light (referred to as a main beam hereinafter) and ±first-order light (referred to as sub-beams hereinafter), as the outward light at the stage after going through the three-beam diffraction structure 12.

Referring back to FIG. 6, there is a polarizing prism 19 disposed at a position on the outward three-beam emission side of the polarizing diffraction element 5 so that the outward three beams emitted from the polarizing diffraction element 5 make incident on the polarizing prism 19.

The polarizing prism 19 reflects the outward three beams making incident from the polarizing diffraction element 5 towards the optical information recording medium 3 side.

There are a collimator lens 20, a quarter-wave plate 21, and an objective lens 22 disposed at positions on the outward three-beam reflection side of the polarizing prism 19.

The objective lens 22 converts the outward three beams making incident from the quarter-wave plate 21 into convergent light to be emitted therefrom.

The optical information recording medium 3 is disposed at a position on the outward three-beam emission side of the objective lens 22, so that the outward three beams emitted from the objective lens 22 make incident to be converged onto the recording face of the optical information recording medium 3.

The outward three beams making incident on the recording face of the optical information recording medium 3 are reflected by the recording face towards the objective lens 22 side that is in the reverse direction of the incident direction.

In that state, the main beam of the outward three beams performs writing and reading of information to/from the recording face. Further, the sub-beams of the outward three beams are used for detecting tracking error signals as necessary.

The three beams reflected by the recording face of the optical information recording medium 3 (referred to as inward three beams hereinafter) travel as the inward light in the reverse direction as that of the outward light.

That is, the inward three beams reflected by the optical information recording medium 3 make incident on the objective lens 22, which are converted into parallel light by the objective lens 22 to be emitted towards the quarter-wave plate 21 side.

The inward three beams emitted from the objective lens 22 make incident on the quarter-wave plate 21, which are converted by the quarter-wave plate 21 into linearly polarized light whose polarization direction (oscillating direction of electric field and magnetic field) is rotated by 90° with respect to that of the outward three beams and emitted towards the collimator lens 20 side.

The inward three beams emitted from the quarter-wave plate 21 make incident on the collimator lens 20, which are converted by the collimator lens 20 into convergent light and emitted towards the polarizing prism 19 side.

The inward three beams emitted from the collimator lens 20 make incident on the polarizing prism 19 and transmit through a light receiving element 23 which will be described later. It is known in this state that about 95% of the inward three beans are transmitted through the polarizing prism 19 and 5% of the inward three beams are reflected towards the light source 2 side.

In the case where a dichroic prism instead of the polarizing prism 19, it is also known that the inward three beams are reflected towards the light source 2 side by the reflectance of about 10%.

There are disposed an astigmatism generating element 51 and a light receiving element 23 such as a photodetector disposed at positions on the inward three-beam transmission side of the polarizing prism 19. The inward three beams as the inward light transmitted through the polarizing prism 19 make incident on the light receiving element 23.

The astigmatism generating element 51 is arranged for allowing focus-servo of the optical information recording medium 3.

The light receiving element 23 receives the inward three beams making incident from the polarizing prism 19 and converts them into electric signals.

The inward three beams as the inward light reflected by the polarizing prism 19 (referred to as return light hereinafter) returns to the light source 2 and make incident on the polarizing diffraction element 5.

The polarization direction of the return light is orthogonal (rotated by 90°) with respect to the polarization direction of the outward light. The polarizing diffraction structure 8 in the polarizing diffraction element 5 functions as a diffraction grating for such return light by generating phase difference between the birefringence material 7 and the translucent adhesive agent 14 due to a refraction index difference.

That is, as shown in FIG. 7B, the polarizing diffraction structure 8 diffracts the return light (TM polarized light) to generate high-order light of ±first-order light or higher and decrease zero-order light.

Thereby, incidence of the return light to the light source 2 can be reduced. As a result, the light source 2 can be properly operated and writing and reading of information can be appropriately performed on the optical information recording medium 3. For example, when using a high-output laser light source as the light source 2, it is possible to oscillate the laser light stably.

As described above, it has been conventionally possible to generate three beams and reduce incidence of the return light to the light source 2 by employing the polarizing diffraction element 5 which comprises the three-beam diffraction structure 12 and the polarizing diffraction structure 8 exhibiting birefringence.

[Patent Literature] Japanese Patent Unexamined Publication 2002-170272

However, as described above, the conventional polarizing diffraction element 5 has a structure in which the polarizing diffraction structure 8 and the three-beam diffraction structure 12 are laminated using another member, the translucent adhesive agent 14. Therefore, selection of a plurality of members and manufacture thereof are extremely difficult, thus facing such problem that it lacks practicality.

Further, even when the polarizing diffraction structure 9 of FIG. 8 is used as the polarizing diffraction structure, it is not easy to bury the birefringence material 7 in the grating grooves in appropriate direction and thickness, Thus, it is still difficult to manufacture the polarizing diffraction element having such polarizing diffraction structure 9.

SUMMARY OF THE INVENTION

The present invention has been designed in view of such problems. The object of the present invention therefore is to provide an optical element with excellent practicality and productivity, comprising both functions of generating three beams and of minimizing the incident light quantity by reducing the incidence of the return light on the light source, which enables simple and effective manufacture of optical element and reduction of the cost as well. Moreover, it is to provide an optical pickup device comprising the same, and an unnecessary light elimination method.

In order to achieve the aforementioned object, the optical element according to a first aspect of the present invention is an optical element provided on an optical path between a light source for emitting coherent light and an optical information recording medium, which comprises a first diffraction structure for generating three beams by diffracting light from the light source, and a second diffraction structure exhibiting structural birefringence for a prescribed polarized light returning to the light source, wherein: the first diffraction structure is formed on a first face of a translucent optical base material, and the second diffraction structure is formed on a second face of the optical base material, respectively; and the optical base material, the first diffraction structure and the second diffraction structure are made of a single material.

With the first aspect of the present invention, the translucent optical base material, the first diffraction structure and the second diffraction structure can be formed by a single material. As a result, it is possible to achieve easy and effective manufacture of the optical element, which has both the function of generating the three beams and the function of reducing incidence of the return light on the light source. Moreover, it is possible to achieve the optical element with excellent practicality and productivity, which allows reduction of the cost.

Further, the optical element according to a second aspect is the optical element of the first aspect, wherein the second diffraction structure comprises: a first recessed-protruded shape on the second face of the optical base material; and a second recessed-protruded shape, which is formed at a position of a protruded part of the first recessed-protruded shape, with fine periods at a smaller pitch width than a wavelength of the light from the light source, and the second diffraction structure exhibits the structural birefringence based on a difference between a refractive index of the single material and a refractive index of medium other than the single material, and shapes of the first recessed-protruded shape and the second recessed-protruded shape.

With the second aspect of the present invention, further, the second diffraction structure can be formed in a simple constitution comprising the first recessed-protruded shape and the second recessed-protruded shape. As a result, compared to the optical element of the first aspect, it enables easier and more effective manufacture of the optical element which have both the function of generating the three beams and the function of reducing the return light to the light source for minimizing the incident light quantity, thereby allowing reduction of the cost even more.

Furthermore, the optical element according to a third aspect is the optical element of the second aspect, wherein heights of a protruded part of the first recessed-protruded shape and a protruded part of the second recessed-protruded shape, and groove depths of the recessed part of the first recessed-protruded shape and the recessed part of the second recessed-protruded shape are the same.

In the third aspect of the present invention, heights of the protruded part of the first recessed-protruded shape and the protruded part of the second recessed-protruded shape, and groove depths of the recessed part of the first recessed-protruded shape and the recessed part of the second recessed-protruded shape are all made uniform. Thus, the second diffraction structure can be constituted in the size to be easily manufactured. As a result, compared to the optical element according to the first or second aspect, it enables still easier and more effective manufacture of the optical element which has both the function of generating the three beams and the function of reducing the return light to the light source for minimizing the incident light quantity.

The optical element according to a fourth aspect is the optical element of any one of the first to third aspects, wherein the second diffraction structure lets through a first linearly polarized light of the light from the light source without diffraction, and reduces zero-order light of a second linearly polarized light whose polarization direction is orthogonal to that of the first linearly polarized light, which is light reflected by the optical information recording medium returning to the light source, among light traveling in a reverse direction of the light emitted from the light source.

With the fourth aspect of the present invention, further, the zero-order light of the second linearly polarized light can be reduced by the birefringence of the second diffraction structure. As a result, compared to the optical element according to any one of the first to third aspects, incidence of a specific linearly polarized light (the second linearly polarized light) on the light source can be more effectively reduced.

Further, the optical element according to a fifth aspect is the optical element of any one of the first to third aspects, wherein the optical base material, the first diffraction structure and the second diffraction structure are integrally molded by injection molding using a single resin material.

With the fifth aspect of the invention, the first diffraction structure and the second diffraction structure can be integrally molded by an inexpensive single resin material. As a result, compared to the optical element according to any one of the first to third aspects, it enables easier and more effective manufacture of the optical element which has both the function of generating the three beams and the function of reducing the return light to the light source for minimizing the incident light quantity, thereby allowing reduction of the cost even more.

Furthermore, the optical pickup device according to a sixth aspect comprises the optical element of any one of the first to third aspects.

With the sixth aspect of the invention, it enables simple and effective manufacture of optical element that comprises both functions of generating three beams and of minimizing the incident light quantity by reducing the incidence of the return light on the light source. Moreover, it is possible to mount, to the optical pickup device, the optical element with excellent practicality and productivity, which allows reduction of the cost.

Moreover, the unnecessary light elimination method according to a seventh aspect is a method for preventing incidence of unnecessary light on an optical pickup device that performs information recording and/or information reproduction to/from an optical information recording medium, wherein: a structural body made of a single material, which comprises a first recessed-protruded shape formed on a prescribed face of a translucent optical base material, and a second recessed-protruded shape formed at a position of a protruded part of the first recessed-protruded shape, with fine periods at a smaller pitch width than a wavelength of the light from the light source, is disposed on an optical path between the light source and the optical information recording medium for diffracting return light to the light source making incident on the structural body so as to reduce return light to a light emission part of the light source.

With the seventh aspect of the invention, incidence of the unnecessary light on the light source can be appropriately minimized by the structural body made of a single material, which comprises the diffraction structure where the first recessed-protruded shape and the second recessed-protruded shape are formed on the prescribed faces of the translucent optical base material. Further, by forming the diffraction structure, which generates the three beams by diffracting the light from the light source, on such structural body using the same single material as that of the structural body, it enables easy and effective manufacture of the optical element which has both the function of generating the three beams and the function of reducing the return light to the light source for minimizing the incident light quantity. Moreover, the cost can be reduced as well.

With the present invention, it is possible to provide the optical element with excellent practicality and productivity, comprising both functions of generating three beams and of minimizing the incident light quantity by reducing the incidence of the return light on the light source, which enables simple and effective manufacture of the optical element and reduction of the cost as well. Moreover, it is possible to provide the optical pickup device comprising the same, and the unnecessary light elimination method.

BRIEF DESCRIPTION OF THE DRAWINGS

FIG. 1 shows cross sections showing an embodiment of an optical element according to the present invention along with the polarization direction of emission light from a light source, in which

DETAILED DESCRIPTION. OF THE PREFERRED EMBODIMENTS

Embodiment of Optical Element

Figure 1A:
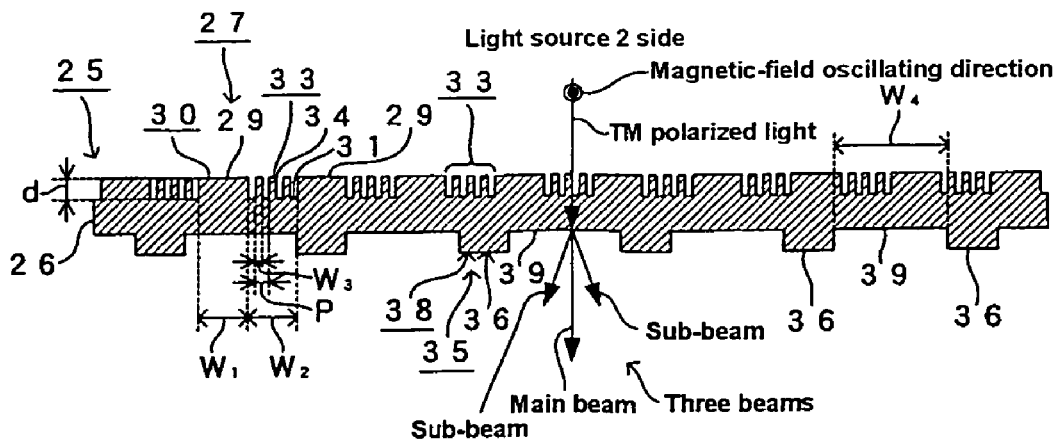
FIG. 1A shows the state where outward light makes incident.

An embodiment of the optical element according to the present invention will be described by referring to FIG. 1 and FIG. 2.

Components having the same or similar fundamental constitutions as those of the conventional case will be described by applying the same reference numerals.

As shown in FIGS. 1A, 1B, 1C and FIG. 2, an optical element 25 according to the embodiment comprises a translucent substrate 26 that is made of a resin material. For the translucent substrate 26, it is possible to use an optical base material that is a transparent material with the band about the wavelength of the light from a light source 2.

Further, the optical element 25 of the embodiment comprises a diffraction structure 27 on the surface of the translucent substrate 26 on the light source 2 side (upper face in FIG. 1).

The diffraction structure 27 is formed integrally with the translucent substrate 26 using the same resin material as the resin material forming the translucent substrate 26.

The diffraction structure 27 comprises a diffraction grating 30 and a plurality of fine structures 33 on the surface of the translucent substrate 26 on the light source 2 side. The diffraction grating 30 has a plurality of protruded parts 29 in lattice form arranged at the same intervals in the width direction that is in the horizontal direction of FIG. 1. The fine structures 33 are fine periodic structures formed respectively at position of grating grooves 31 between the protruded parts 29 that are adjacent to each other in the diffraction grating 30.

In the embodiment, width size $W_1$ of the protruded part 29 of the diffraction grating 30 and width size $W_2$ of the fine structure 33 shown in FIG. 1 are equal to each other. Preferably, the sizes of $W_1$ and $W_2$ are considered as about 3 µm, respectively.

Furthermore, each fine structure 33 has a plurality of minute protruded parts 34 with smaller width size $W_3$ than that of the protruded part 29 of the diffraction grating 30 being arranged at the same intervals in the width direction.

Pitch P as the forming period of the minute protruded parts 34 is the size shorter than the wavelength of the light emitted from the light source 2 that is used for the optical element 25. The preferable pitch P of the minute protruded parts 34 is considered as 100-200 nm.

The height of the minute protruded part 34 (size in the vertical direction of FIG. 1) is formed as the same height d as that of the protruded part 29.

Such diffraction structure 27 satisfies following expression (1) for a first linearly polarized light (the light whose magnetic-field oscillating direction is parallel to the longitudinal direction of the grating groove 31), which is the outward light at the linear-polarization stage of the light that is the emission light of the light source 2, traveling towards the optical information recording medium 3 from the light source 2.

Here, in the following expression (1), d is the height of the protruded part 29 of the diffraction grating 30 and that of the minute protruded part 34 of the fine structure 33 in the diffraction structure 27, $n_1$ is the refractive index of the protruded part 29 of the diffraction grating 30 (in other words, refractive index of the resin material itself), $n_{TM}$ is the equivalent refractive index (effective refractive index) of the fine structure 33 with respect to the TM polarized light, and λ is the wavelength of the TM polarized light. The equivalent refractive index of the fine structure 33 means the refractive index of the fine structure 33 when the fine structure 33 in which the minute protruded parts 34 and air layers are arranged alternately in the width direction is considered as a single substance with a single refractive index.

$$d(n_1 - n_{TM}) = \lambda \quad (1)$$

The expression (1) indicates the condition where the diffraction structure 27 lets through the TM polarized light making incident on the diffraction structure 27 from the light source 2 side without diffraction (referred to as "pass through" hereinafter) as shown I FIG. 1A.

Furthermore, the diffraction structure 27 satisfies following expression (2) for a second linearly polarized light whose polarization direction is orthogonal to the first linearly polarized light (the light whose magnetic-field oscillating direction is orthogonal to the longitudinal direction of the grating groove 31), which is the return light traveling towards the light source 2 as the inward light that is the light reflected by the optical information recording medium 3 after emitted from the light source 2.

Here, in the expression (2), d, n, and λ are the same as those in expression (1). $n_{TE}$ is the equivalent refractive index of the fine structure 33 with respect to the TE polarized light.

$$d(n_1 - n_{TE}) = \lambda/2 \quad (2)$$

The expression (2) indicates the condition where the diffraction structure 27 generates diffracted light other than zero-order light through diffracting the TE polarized light making incident on the diffraction structure 27 from the opposite side of the light source 2 and minimize the zero-order light quantity as shown I FIG. 1 B. Further, the condition is the same as the condition where the TE polarized light that is the return light does not make incident on the light source 2.

In other words, the aforementioned expressions (1) and (2) are the conditional expressions for the diffraction structure 27 to have the birefringence based on the refractive index of the resin material itself, the refractive index of the air layer, and the shape of the diffraction structure 27, etc. (i.e. the conditional expressions of the structural birefringence).

The TE polarized light becomes the light making incident on the diffraction structure 27 from the opposite side of the light source 2 after going through a three-beam diffraction structure 35 which will be described later.

Therefore, the diffraction structure 27 satisfying the expressions (1) and (2) can exhibit the birefringence like the conventional case. Thus, it allows the TM polarized light of the outward light to pass through and the zero-order light to be minimized by diffraction the TE polarized light of the inward light.

As a specific design example, when the ratio of the width size $W_3$ of the minute protruded part 34 of the fine structure 33 and the pitch P ($W_3/P$) is 0.21, the refractive index $n_1$ of the resin material itself for forming the minute protruded part 34 is 1.607, and the refractive index of the air layer between the minute protruded parts 34 is 1, for example, $n_{TE}$=1.500 and $n_{TM}$=1.392. Further, assuming that $\lambda$=0.66 µm, when substituting the value of $\lambda$(0.66 µm), the value of $n_{TE}$(1.500) and the value of $n_{TM}$(1.392) into the expression (1), $d$=3.07 µm.

Furthermore, the optical element 25 of the embodiment comprises the three-beam diffraction structure 35 on the surface (lower face in FIG. 1) of the translucent substrate 26 on the opposite side facing the light source 2.

The three-beam diffraction structure 35 is integrally formed with the translucent substrate 26 and the diffraction structure 27 by the same resin material as the resin material forming the translucent substrate 26 and the diffraction structure 27.

The three-beam diffraction structure 35 comprises a diffraction grating 38 in which a plurality of protruded parts 36 are arranged at the same intervals in the width direction. As a specific design example, the width size $W_4$ of diffraction grooves 39 between the protruded parts 36 that are adjacent to each other is set as about 17 µm.

Figure 5:
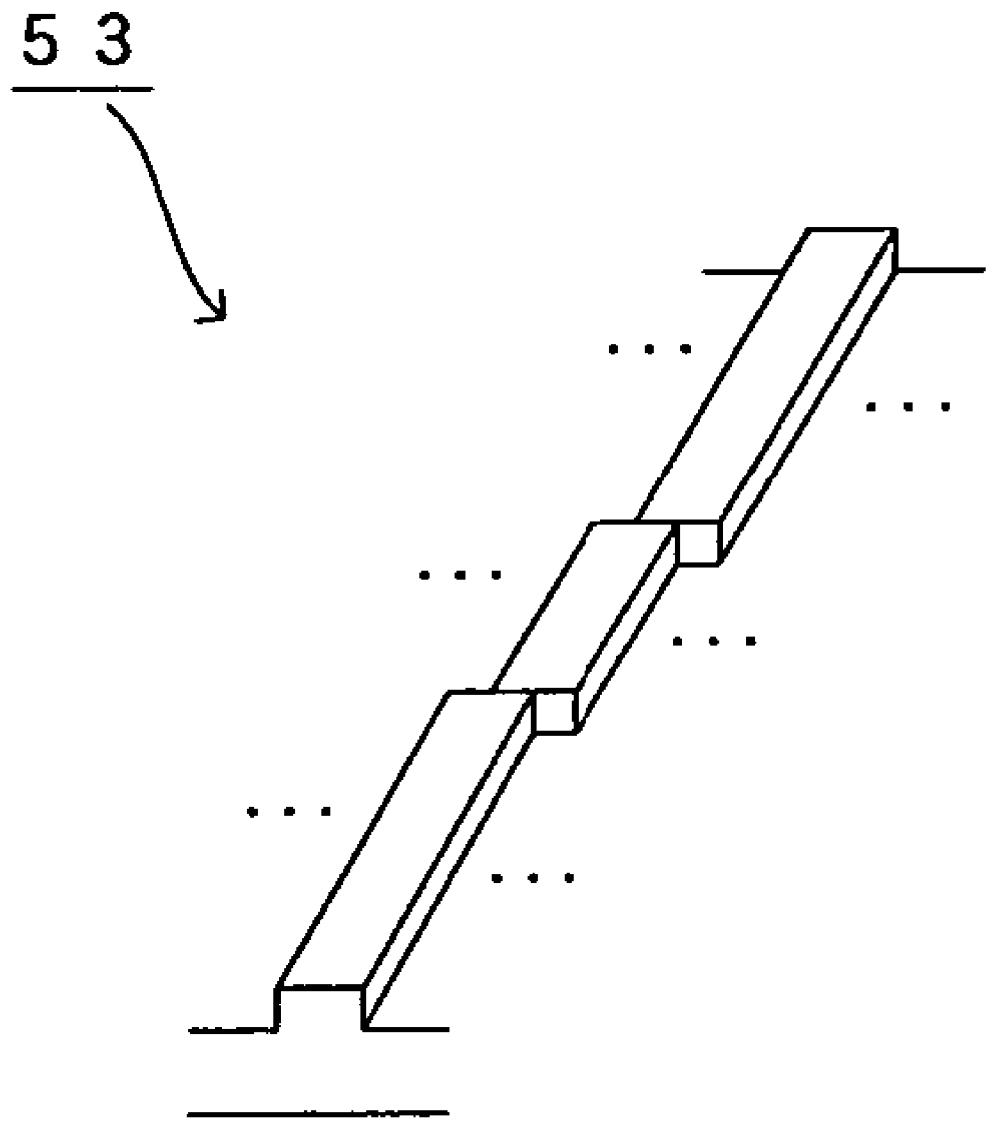
FIG. 5 is a block diagram for showing an example of the optical element comprising a regular three-beam diffraction structure.
Figure 6:
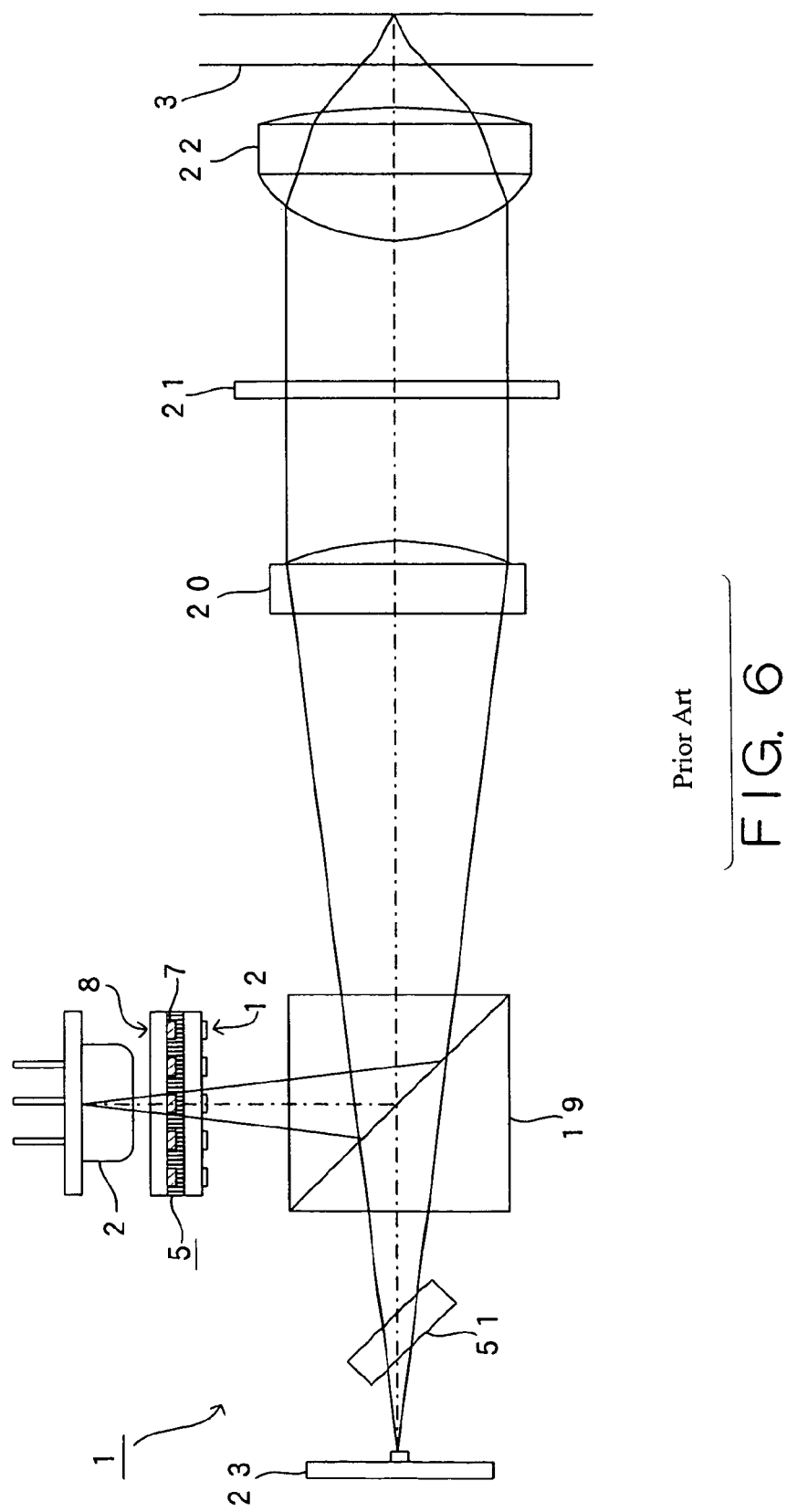
FIG. 6 is a block diagram for showing an example of the optical pickup device that has been employed conventionally.

The three-beam diffraction structure 35 diffracts the TM polarized light that passes through the diffraction structure 27 and makes incident on the three-beam diffraction structure 35 from the light source 2 side for generating three beams constituted of the main beam and sub-beams. As the structure other than the three-beam diffraction structure 35 of the embodiment, a regular three-beam diffraction structure 53 as shown in FIG. 5 may be used for providing a function of generating three beams to the translucent substrate 26 of the optical element 25. The constitution of the three-beam structure 53 is not limited to the one that is formed linearly when viewing the constitution from the light source 2 side two-dimensionally. It may be structured in a curvilinear form such as hologram pattern, and three-beam diffraction structure in a special form may be employed as well.

The three-beam diffraction structure 35 generates the return-light three beams by diffracting the TE polarized light that is the inward light making incident from the opposite side of the light source 2.

Figure 1B:
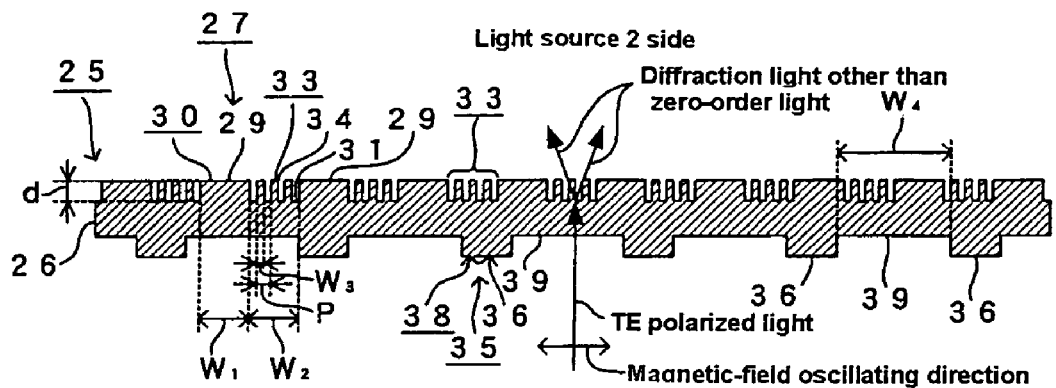
FIG. 1B shows the state where inward light makes incident.
Figure 1C:
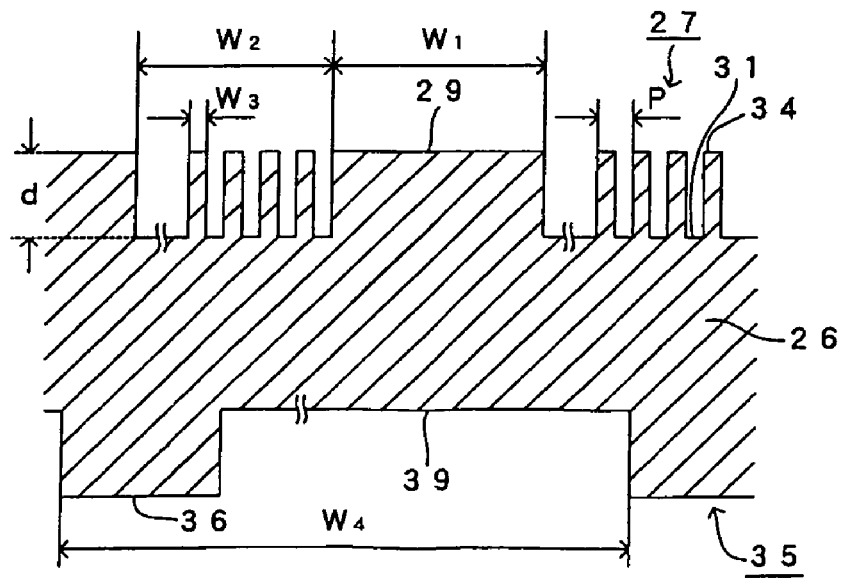
FIG. 1C is an enlarged cross section.

In FIG. 1B, only the main beam among the return-light three beams is illustrated as the TE polarized light that makes incident on the diffraction structure 27 from the opposite side of the light source 2.

The optical element 25 having such constitution enables generation of three beams by diffracting the three-beam diffraction structure 35 the TM polarized light that makes incident on the light source 2 side and passes therethrough using the diffraction structure 27. Further, it allows minimization of the zero-order light as the return light to the light source 2 by generating the high-order diffraction light of ±first-order or higher other than the zero-order light through diffracting, by the diffraction structure 27, the TE polarized light as the return light making incident from the opposite side of the light source 2.

That is, like the conventional case, the optical element 25 according to the embodiment can have both the function of generating the three beams and the function of preventing incidence of the return light to the light source 2.

Further, it is possible to provide the performance of eliminating the return light to the light source 2, which is equivalent to that of the conventional case or even better (provided that the return light making incident on the optical element 25 among the return light to the light source 2 is 1, the zero-order light emitted from the optical element 25 is 0.03 or less).

In addition to having the same functions and the like as those of the conventional case described above, the embodiment allows easy and effective manufacture of the optical element 25 having both the function of generating the three beams and the function of preventing the incidence of return light to the light source 2, since the translucent substrate 26, the diffraction structure 27 and the three-beam diffraction structure 35 are formed integrally by a single resin material.

As a method for integrally molding the translucent substrate 26, the diffraction structure 27 and the three-beam diffraction structure 35, injection molding of the resin material may be employed. Moreover, the optical element 25 can be manufactured through nanomachining and high-precision processing using a laser machining device, photolithography device, etc.

Figure 7A:
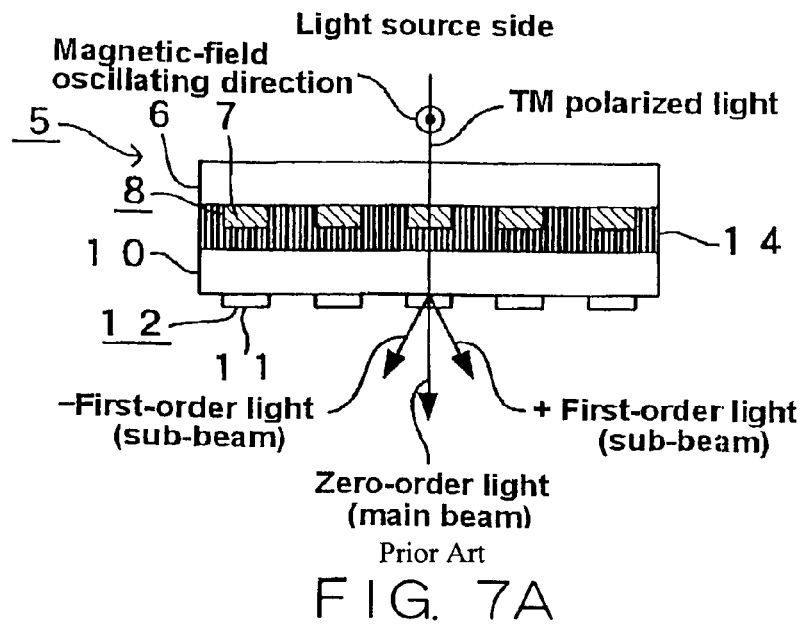
FIG. 7 is a cross section for showing a polarizing diffraction element mounted to the optical pickup device of FIG. 6, along with the polarizing direction of the light from the light source.
Figure 7B:
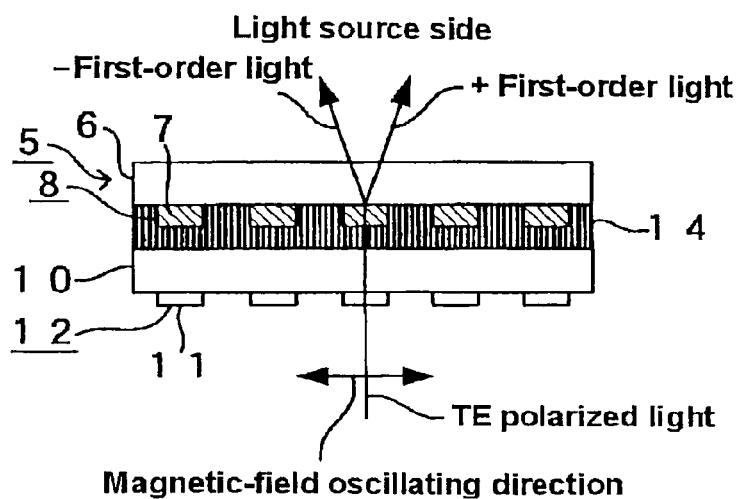
Figure 8:
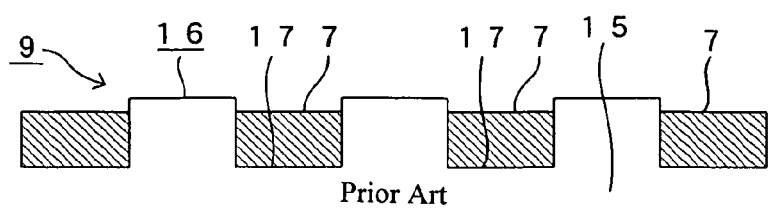
FIG. 8 is a schematic cross section for showing a constitutional example of a polarizing diffraction structure that is different from the one in the optical element that has been employed conventionally as in FIG. 7.

Furthermore, the embodiment allows reduction of the size in the thickness direction compared to the conventional polarizing diffraction element 5 shown in FIG. 7, thereby achieving more size reduction.

Further, the diffraction structure 27 of the embodiment comprises the fine structure 33. As a result, the diffraction structure 27 with excellent birefringence can be formed easily with high precision.

First Embodiment of Optical Pickup Device

Next, as a first embodiment of the optical pickup device according to the present invention, there will be described an embodiment of the optical pickup device which writes information on a DVD as an optical information recording medium by referring to FIG. 3.

Components having the same or similar fundamental constitutions as those of the conventional case will be described by applying the same reference numerals.

Figure 3:
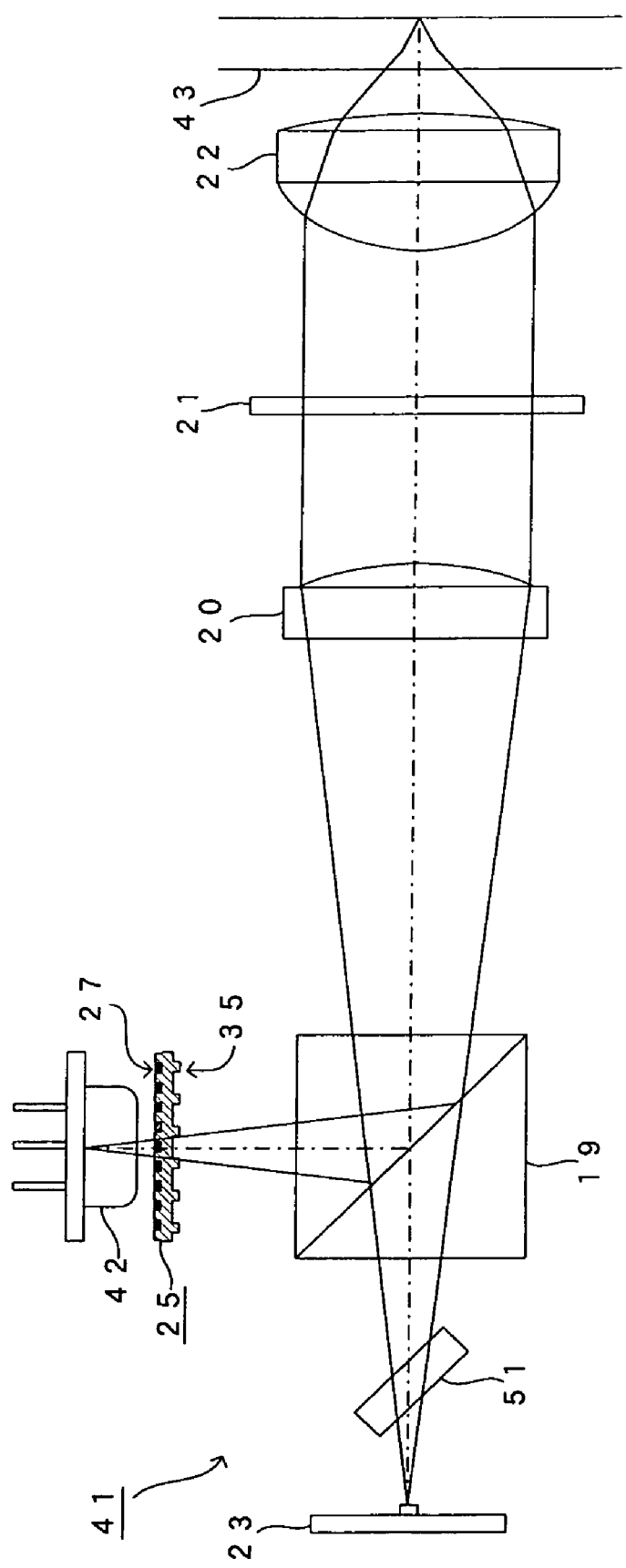
FIG. 3 is a block diagram for showing a first embodiment of an optical pickup device according to the present invention.

As shown in FIG. 3, an optical pickup device 41 comprises the fundamental constitution of the conventional pickup device 1 as it is.

In the embodiment, however, the light source is a DVD light source 42 for emitting coherent light with the wavelength of 660 nm. In addition, the optical information recording medium is a DVD 43.

Further, instead of the polarizing diffraction element 5, above-described optical element 25 is disposed at the position of the polarizing diffraction element 5 with the diffraction structure 27 facing towards the DVD light source 42 side.

The optical element 25 has both the function of generating DVD-outward three beams as the three beams and the function of preventing incidence of the return light on the DVD light source 42.

For writing information on the DVD 43 by such optical pickup device 41 according to the embodiment, first, TM polarized light as the first linearly polarized light is emitted from the DVD light source 42 as outward light. Upon this, the TM polarized light makes incident on the diffraction structure 27 of the optical element 25. The DVD light source 42 can be rotated to constitute the optical pickup device 41 such that the polarization direction of the outward light from the DVD light source 42 is made parallel to the longitudinal direction of the grooves of the diffraction structure 27 to make incident on the optical element 25. Furthermore, the optical element 25 may be disposed in accordance with the polarization direction of the light emitted from the DVD light source 42.

The TM polarized light making incident on the diffraction structure 27 passes therethrough due to the birefringence of the diffraction structure 27.

Thereby, the TM polarized light passing through the diffraction structure 27 makes incident on the three-beam diffraction structure 35, which are diffracted by the three-beam structure 35.

With this, the DVD-outward three beams as the outward light are generated and emitted towards the polarizing prism 19 side.

The DVD-outward three beams emitted form the three-beam diffraction structure 35 make incident on the polarizing prism 19, which are reflected by the polarizing prism 19 towards the collimator lens 20 side.

The DVD-outward three beams reflected by the polarizing prism 19 make incident on the collimator lens 20, which are converted into parallel light by the collimator lens 20 and emitted towards the quarter-wave plate 21 side.

The DVD-outward three beams emitted from the collimator lens 20 make incident on the quarter-wave plate 21, which are converted from the linearly polarized light into the circularly polarized light by the quarter-wave plate 21 and emitted towards the objective lens 22 side.

The DVD-outward three beams emitted from the quarter-wave plate 21 make incident on the objective lens 22, which are converted into convergent light by the objective lens 22 and emitted towards the DVD 43 side.

The DVD-outward three beams emitted from the objective lens 22 make incident and converge on the recording face of the DVD 43, which are reflected by the recording face as the DVD-inward three beams of the inward light towards the objective lens 22 side that is in the reverse direction of the incident direction.

With this, in the case of DVD-R and DVD+R, for example, the main beam of the DVD-outward three beams writes information on the recording face by generating chemical change in dyestuffs by increasing the temperature of an organic dyestuff layer formed on the recording face of the DVD 43. Further, sub-beams of the DVD-outward three beams are used for detecting tracking error signals.

The DVD-inward three beams reflected by the recording face of the DVD 43 make incident on the objective lens 22, which are converted into parallel light by the objective lens 22 and emitted to the quarter-wave plate 21 side.

The DVD-inward three beams emitted from the objective lens 22 make incident on the quarter-wave plate 21, which are converted from the circularly polarized light into linearly polarized light by the quarter-wave plate 21 and emitted towards the collimator lens 20 side.

The DVD-inward three beams emitted from the quarter-wave plate 21 make incident on the collimator lens 20, which are converted into convergent light by the collimator lens 20 and emitted towards the polarizing prism 19 side.

The inward three beams emitted from the collimator lens 20 make incident on the polarizing prism 19, which are transmitted by the polarizing prism 19 towards the light receiving element 23 side with transmittance of about 95% and reflected towards the DVD light source 42 side as the return light with reflectance of about 5%.

The DVD-inward three beams transmitting through the polarizing prism 19 make incident on the light receiving element 23 after transmitting through the astigmatism generating element 51, which are converted into electric signals by the light receiving element 23.

In the meantime, the return light reflected by the polarizing prism 19 returns to the DVD light source 42 and makes incident on the three-beam diffraction structure 35 of the optical element 25.

The return light making incident on the three-beam diffraction structure 35 make incident on the diffraction structure 27 after being isolated into three beams of return light through diffraction by the three-beam diffraction structure 35.

The return light making incident on the diffraction structure 27 is diffracted by the birefringence of the diffraction structure 27.

With this, the diffracted light other than the zero-order light is generated, thus minimizing the zero-order light to be emitted from the diffraction structure 27.

The diffracted light is emitted in the direction away from the DVD light source 42 so that it does not directly make incident on the DVD light source 42. The optical element 25 is disposed to interrupt incidence of the return light on the coherent-light emission part of the DVD light source 42, i.e. disposed at the position that can interrupt incidence of the unnecessary light on the light source 42. Furthermore, the diffraction structure 27 of the optical element 25 may be formed on the emission window of the DVD light source 42 to be arranged at a position to prevent the incidence of the return light to the emission part itself of the DVD light source 42. Alternatively, it may be provided to prevent the return light to the face of the polarizing prism 19 on the light source side.

As a result, the DVD light source 42 can be properly driven. Further, by disposing the optical element 25 at a prescribed position of the optical pickup device 41, it is possible to minimize the instability of the optical property of the entire optical system of the optical pickup. Thus, writing of information to the DVD 43 can be properly carried out.

It is also possible to read out information that has been already recorded to the DVD 43 properly by the same structure (shown in FIG. 3) as the case of writing. The embodiment allows proper recording and/or reproduction of information to/from the DVD 43. Moreover, the entire optical system can be provided with high precision, thereby achieving still higher stabilization.

Second Embodiment of Optical Pickup Device

Next, a second embodiment of the optical pickup device according to the present invention will be described by referring to FIG. 4.

Components having the same or similar fundamental constitutions as those of the first embodiment will be described by applying the same reference numerals.

Figure 4:
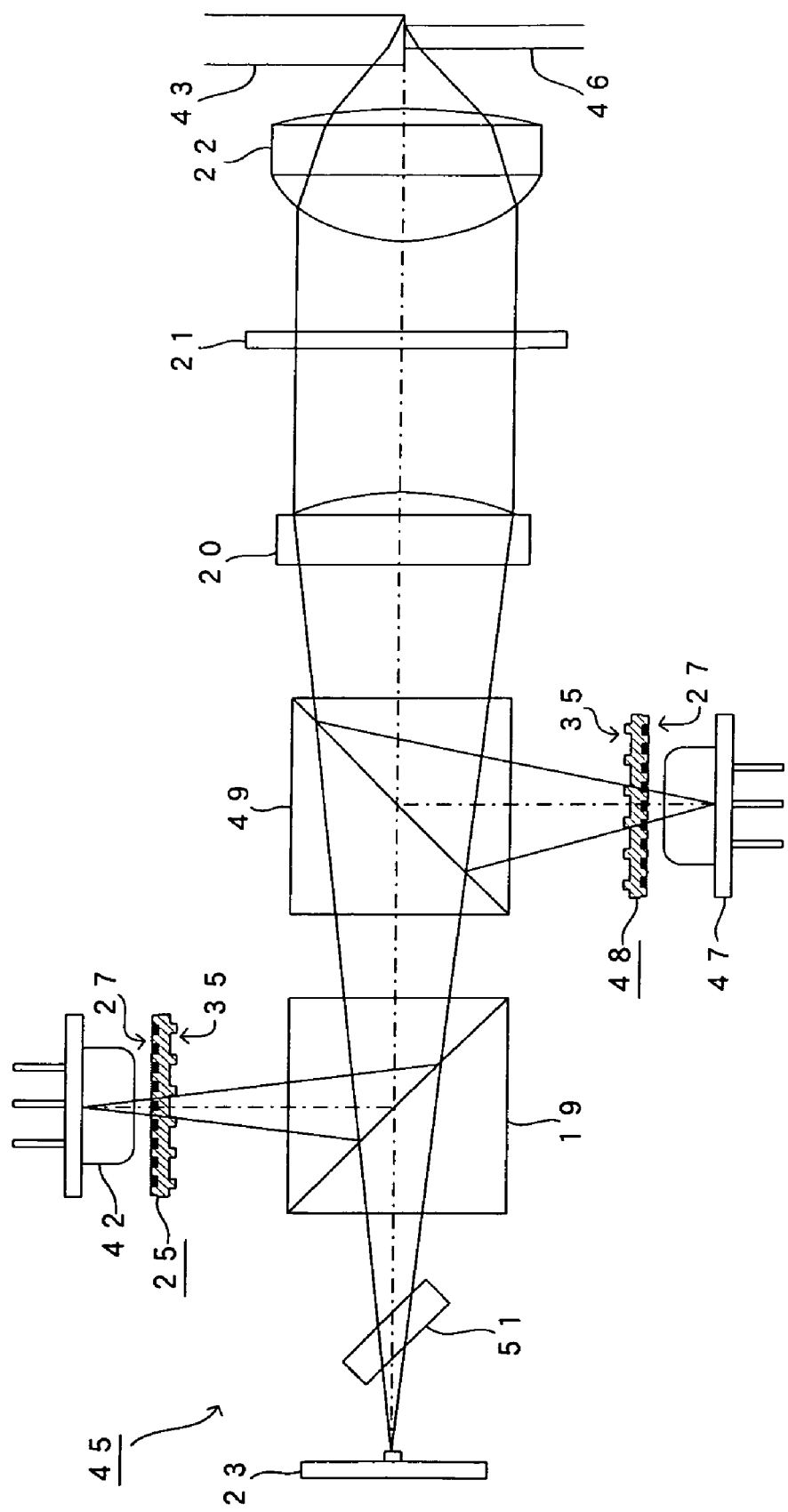
FIG. 4 is a block diagram for showing a second embodiment of the optical pickup device according to the present invention.

As shown in FIG. 4, in addition to the constitution of the first embodiment, an optical pickup device 45 of the embodiment is so formed that it can be used also for reading out information from a CD 46.

Specifically, in addition to the constitution of the first embodiment, the optical pickup device 45 of the embodiment further comprises a CD light source 47. The light source 47 emits coherent light with the wavelength of 785 nm as the outward light.

Like the above-described optical element 25, an optical element 48 having a constitution, in which the translucent substrate 26, the diffraction structure 27 and the three-beam diffraction structure 35 are integrally molded by the same resin, is disposed at a position on the emission side of CD light source 42, from which the light (outward light) is emitted. The optical element 48 is disposed with the diffraction structure 27 facing the CD light source 47 side.

The optical element 48 has both the function of generating CD-outward three beams as the three beams and the function of preventing incidence of the return light on the CD light source 47. The fundamental constitution is completely the same as that of the optical element except for the specific size.

There is a polarizing prism (referred to as a second polarizing prism 49 hereinafter) corresponding to CD light source 47 disposed at a position on the optical path of the DVD-outward three beams and the DVD-inward three beams, which is the position on the emission side of CD-outward three beams in the optical element 48.

The second polarizing prism 49 reflects the CD-outward three beams emitted from the three-beam diffraction structure 35 of the optical element 48 towards the collimator lens 20 side. Further, the second polarizing prism 49 lets through the DVD-outward three beams and the DVD-inward three beams as they are, so that there is no influence when writing and/or reading out information to/from the DVD 43.

For reading out information from the CD 46 by such optical pickup device 45, first, the first linearly polarized light is emitted from the CD light source 47 as the outward light for making incident on the diffraction structure 27 in the optical element 48.

The first linearly polarized light (TM polarized light) making incident on the diffraction structure 27 passes therethrough due to the birefringence of the diffraction structure 27.

The TM polarized light passing through the diffraction structure 27 makes incident on the three-beam diffraction structure 35, which is diffracted by the three-beam diffraction structure 35.

With this, the CD-outward three beams as the outward light are generated and emitted towards the second polarizing prism 49 side.

The CD-outward three beams emitted from the three-beam diffraction structure 35 make incident on the second polarizing prism 49, which are emitted by the second polarizing prism 49 towards the collimator lens 20 side.

The CD-outward three beams reflected by the second polarizing prism 49 make incident on the collimator lens 20, which are converted into parallel light by the collimator lens 20 and emitted towards the quarter-wave plate 21 side.

The CD-outward three beams emitted from the collimator lens 20 make incident on the quarter-wave plate 21, which are converted from the linearly polarized light into the circularly polarized light by the quarter-wave plate 21 and emitted towards the objective lens 22 side.

The CD-outward three beams emitted from the quarter-wave plate 21 make incident on the objective lens 22, which are converted into convergent light by the objective lens 22 and emitted towards the CD 46 side.

The CD-outward three beams emitted from the objective lens 22 make incident on the recording face of the CD 46, which are reflected as the CD-inward three beams as the inward light towards the objective lens 22 side by the recording face of the CD 46.

At that time, the main beam of the CD-inward three beams is the light that has attained the information recorded to the recording face by the intensities of the light reflection from the recording face. Further, the sub-beams of the CD-inward three beams are used for detecting the tracking error signals.

The CD-inward three beams reflected by the recording face of the CD make incident on the objective lens 22, which are converted into parallel light by the objective lens 20 and emitted towards the quarter-wave plate 21 side.

The CD-inward three beams emitted from the objective lens 22 make incident on the quarter-wave plate 21, which are converted from the circularly polarized light into the linearly polarized light by the quarter-wave plate 21 and emitted towards the collimator lens 20 side.

The CD-inward three beams emitted from the quarter-wave plate 21 make incident on the collimator lens 20, which are converted into the convergent light by the collimator lens 2o and emitted towards the second polarizing prism 49 side.

The inward three beams emitted from the collimator lens 20 make incident on the second polarizing prism 49, which are transmitted by the second polarizing prism 49 towards the light receiving element 23 side with transmittance of about 95% and reflected towards the CD light source 47 side as the return light with reflectance of about 5%.

The CD-inward three beams transmitting through the second polarizing prism 49 make incident on the light receiving element 23 after transmitting through the polarizing prism 19 and the astigmatism generating element 51, which are converted into electric signals by the light receiving element 23 to be used for reproducing information.

In the meantime, the return light reflected by the second polarizing prism 49 returns to the CD light source 47 and makes incident on the three-beam diffraction structure 35 of the optical element 48.

The return light making incident on the three-beam diffraction structure 35 make incident on the diffraction structure 27 after being isolated into three beams of return light through diffraction of the three-beam diffraction structure 35.

The return light that is the TE polarized light making incident on the diffraction structure 27 is diffracted by the birefringence of the diffraction structure 27.

With this, the diffracted light other than the zero-order light is generated, thus minimizing the zero-order light to be emitted from the diffraction structure 27.

The diffracted light is emitted to be away from the CD light source 47 so that it does not directly make incident on the CD light source 47. The optical element 48 is disposed to interrupt incidence of the return light on the emission part of the CD light source 47, which emits the coherent light, i.e. at the position that enables interruption of incidence of the unnecessary light on the light source 47. Furthermore, the diffraction structure 27 of the optical element 48 may be formed on the emission window of the CD light source 47 to be arranged at a position to prevent the incidence of the return light on the emission part itself of the CD light source 47. Alternatively, it may be provided to prevent the return light to the face of the polarizing prism 49 on the light source side.

As a result, the CD light source 47 can be properly driven and reading out of information from the CD 46 can be carried out appropriately. That is, the light emitted from the CD light source 47 can be stabilized and accuracy of information detection by the light receiving element 23 can be improved, which allows high precision of the entire optical pickup system and more stability.

The behavior of the optical pickup device 45 when writing information to the DVD 43 is the same as that of the first embodiment. Thus, the description thereof will be omitted.

As described above, it is possible with the embodiment to form the translucent substrate 26, the diffraction structure 27 and the three-beam diffraction structure 35 integrally by a single resin material.

As a result, it is possible to achieve easy and effective manufacture of the optical elements 25 and 48, which have both the function of generating the three beams and the function of preventing incidence of the return light on the light sources 2, 42 and 47. Moreover, it is possible to achieve the optical elements 25 and 48 with excellent practicality and productivity, which allows reduction of the cost.

The present invention is not limited to the above-described embodiments but various modifications are possible as necessary.

For example, a dichroic prism and a polarizing beam splitter may be used instead of the polarizing prisms 19 and 49.

The present invention is not limitedly applicable to the optical element made of a resin material but can be effectively applied to an optical element that is formed by using a material other than the resin material, such as glass.

Further, it is illustrated in the above-described embodiments that the groove direction of the protruded part 29 in the diffraction structure 27 and the groove direction of the three-beam diffraction structure 35 are in the same direction. However, it is also possible in the embodiment to form the groove direction of the three-beam diffraction structure 35 to be in a different direction. The protruded part 36 of the three-beam diffraction structure 35 may be formed in a plane shape and the like.

Figure 2:
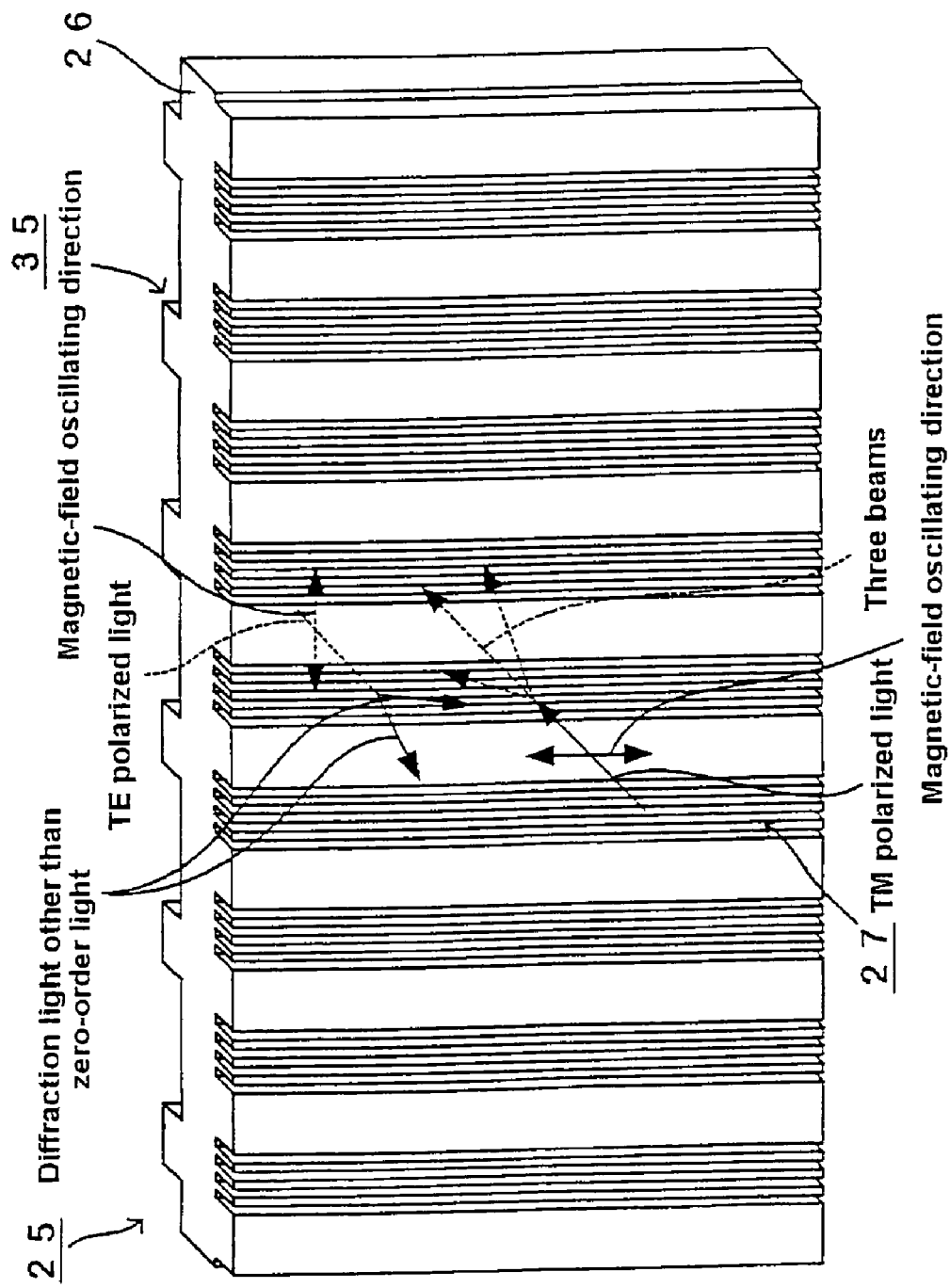
FIG. 2 is a perspective view for showing the optical element of FIG. 1 along with the polarization direction of the light from the light source.

Furthermore, in FIGS. 1A, 1B, and FIG. 2 which are referred to in the above-described embodiments, there are illustrated ten protruded parts 29 of the diffraction grating 30, and three minute protruded parts 34 provided between the protruded parts 29, respectively. However, they are not limited to those numbers. The numbers of the protruded parts 29 and the minute protruded part 34 of the diffraction grating 30 may be set as a plurality of numbers that satisfy the above-described expressions (1) and (2) so as to reduce the return light to the light source for minimizing the incident light quantity to the light emission part itself of the light source.

Furthermore, the sectional shape of the minute protruded part 34 is not necessarily limited to the rectangular sectional face as shown in FIG. 1 and FIG. 2, but sectional shapes other than the rectangular sectional shape such as triangular sectional shape (include shape with steps) may be selected.

Furthermore, it is described by referring to FIG. 1 and FIG. 2 that the width size of the protruded part 29 and that of the recessed part in the diffraction grating 30 are the same. However, they may not be in the same size as long as it is the size which can satisfy the above-described expressions (1) and (2), and can prevent the incidence of the return light containing the high-order diffraction light on the emission part itself of the emission light in the light source.

Moreover, the present invention can be effectively applied to an optical pickup device comprising a light source for emitting the coherent light with the wavelength of 405 nm, which is capable of writing and reading out of information to a large-capacity optical information recording medium such as Blue-ray and HD DVD.

What is claimed is:

1. An optical element provided on an optical path between a light source for emitting coherent light and an optical information recording medium, comprising a first diffraction structure for generating three beams by diffracting light transmitted through a translucent optical base material from said light source is formed on a first face of said translucent optical base material, and a second diffraction structure which exhibits a structural birefringence for a prescribed polarized light transmitted through said translucent optical material and returns to said light source, is formed on a second face of said translucent optical base material, respectively;

said translucent optical base material, said first diffraction structure and said second diffraction structure are integrally made of a single material; and said optical base material and said first and second diffraction structures are formed as a single body.

2. The optical element according to claim 1, wherein said second diffraction structure comprises: a first recessed-protruded shape on said second face of said optical base material; and a second recessed-protruded shape, which is formed at a position of a recessed part of said first recessed-protruded shape, with fine periods at a smaller pitch width than a wavelength of said light from said light source, said second diffraction structure exhibiting said structural birefringence based on a difference between a refractive index of said single material and a refractive index of medium other than said single material, and shapes of said first recessed-protruded shape and said second recessed-protruded shape.

3. The optical element according to claim 2, wherein heights of a protruded part of said first recessed-protruded shape and a protruded part of said second recessed-protruded shape, and groove depths of said recessed part of said first recessed-protruded shape and said recessed part of said second recessed-protruded shape are same.

4. The optical element according to any one of claims 1-3, wherein said second diffraction structure lets through a first linearly polarized light of said light from said light source without diffraction, and reduces zero-order light of a second linearly polarized light whose polarization direction is orthogonal to that of said first linearly polarized light, which is light reflected by said optical information recording medium returning to said light source, among light traveling in a reverse direction of said light emitted from said light source.

5. The optical element according to any one of claims 1-3, wherein said optical base material, said first diffraction structure and said second diffraction structure are integrally molded by injection molding using a single resin material.

6. An optical pickup device, comprising said optical element according to any one of claims 1-3.

7. The optical element of claim 1, wherein said first face and said second face are on opposite sides of the optical base material.

8. The optical element of claim 1 wherein said first and second faces are upper and lower faces of said optical base material.

9. The optical element of claim 2 wherein said second diffraction structure allows through a TM polarized light incident on said second diffraction structure from said light source side without diffraction when an expression (1) is met as follows:

$$d(n_1-n_{TM})=\lambda \quad (1)$$

wherein d is a height of said first and second recessed-protruded shape, $n_1$ is a refractive index of the first recessed-protruded shape, $n_{TM}$ is an equivalent refractive index of second recessed-protruded shape and $\lambda$ is a wavelength of said TM polarized light.

10. The optical element according to claim 2 or 9, wherein said second diffraction structure generates diffracted light other than zero-order by diffracting TE polarized light incident on said second diffraction structure from an opposite side from said light source side when an expression (2) is met as follows:

$$d(n_1-n_{TE})=\lambda/2 \quad (2)$$

wherein d is a height of said first and second recessed-protruded shape, $n_1$ is a refractive index of the first recessed-protruded shape, $n_{TE}$ is an equivalent refractive index of second recessed-protruded shape and $\lambda$ is a wavelength of said TE polarized light.

* * * * *